United States Patent
Cho

(10) Patent No.: US 8,023,224 B2
(45) Date of Patent: Sep. 20, 2011

(54) APPARATUS TO PREVENT STICKING OF SPINDLE MOTOR AND HARD DISK DRIVE HAVING THE SAME

(75) Inventor: Han-Rae Cho, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 1096 days.

(21) Appl. No.: 11/780,025

(22) Filed: Jul. 19, 2007

(65) Prior Publication Data

US 2008/0019048 A1 Jan. 24, 2008

(30) Foreign Application Priority Data

Jul. 21, 2006 (KR) .................. 10-2006-0068431

(51) Int. Cl.
*G11B 17/02* (2006.01)

(52) U.S. Cl. .................. 360/98.07; 360/99.08

(58) Field of Classification Search ........... 360/98.07, 360/99.08, 97.01, 98.01
See application file for complete search history.

(56) References Cited

U.S. PATENT DOCUMENTS

| | | | | |
|---|---|---|---|---|
| 5,323,076 | A | * | 6/1994 | Hajec .............. 310/90 |
| 5,623,382 | A | * | 4/1997 | Moritan et al. ...... 360/99.08 |
| 5,751,085 | A | * | 5/1998 | Hayashi ............ 310/90 |
| 6,519,112 | B1 | | 2/2003 | Iwaki |
| 7,239,477 | B2 | * | 7/2007 | Aiello et al. ........ 360/99.08 |
| 2006/0002011 | A1 | * | 1/2006 | Yamamoto et al. ... 360/99.08 |

FOREIGN PATENT DOCUMENTS

| | | |
|---|---|---|
| JP | 04-195380 | 7/1992 |
| KR | 10-192668 | 1/1999 |
| KR | 10-267368 | 7/2000 |
| KR | 10-429842 | 3/2003 |

* cited by examiner

*Primary Examiner* — Jefferson Evans
(74) *Attorney, Agent, or Firm* — Stanzione & Kim, LLP

(57) ABSTRACT

A hard disk drive includes a base, a cover coupled to an upper portion of the base to accommodate a plurality of parts between the cover and the base, a spindle motor including a FDB (fluid dynamic bearing) having an FDB fixing portion fixed to the base and an FDB rotation portion partially inserted in an inside of the FDB fixing portion and which rotates with respect to the FDB fixing portion, a hub to support a disk, having an end portion coupled to the FDB rotation portion, and which rotates with the FDB rotation portion and a power generation portion to generate power to rotate the hub, and an anti-stick portion provided with at least one of the cover and the spindle motor and which prevents the FDB rotation portion from being restricted as the FDB rotation portion partially contacts the FDB fixing portion by an impact applied to the spindle motor when the disk rotates.

30 Claims, 9 Drawing Sheets

APPARATUS TO PREVENT STICKING OF SPINDLE MOTOR AND HARD DISK DRIVE HAVING THE SAME

CROSS-REFERENCE TO RELATED APPLICATIONS

This application claims under 35 U.S.C. §119(a) priority of Korean Patent Application No. 10-2006-0068431, filed on 21 Jul. 2006, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a hard disk drive which can effectively prevent generation of sticking so that a disk can smoothly rotate. Thus, the performance and reliability of the hard disk drive are improved.

2. Description of the Related Art

Hard disk drives (HDDs) formed of electronic parts and mechanical parts is are memory devices to record and reproduce data by converting digital electric pulses to a magnetic field that is more permanent. The HDDs are widely used as auxiliary memory devices of computer systems because they are capable of providing fast access time to a large amount of data.

With the recent increase in TPI (track per inch; a density in a direction along a radius of a disk) and BPI (bits per inch; a density in a direction along a thickness of a disk), and because BPI×TPI=BPSI, the HDD has achieved high areal density capacities and its field of application has expanded. Areal density, also sometimes called bit density, refers to the amount of data that can be stored in a given amount of area on a hard disk recording medium. Since disk surfaces are of course two-dimensional, areal density is a measure of a number of bits that can be stored in a unit of area. It is usually expressed in bits per square inch (BPSI). The general structure of the HDD will be briefly described with reference to FIGS. 1 through 3.

FIG. 1 is a partial cross-section view of a conventional HDD. FIG. 2 is an enlarged view of a portion A of FIG. 1. FIG. 3 is a view illustrating a state in which a fluid dynamic bearing (FDB) is stuck to an FDB fixing portion of FIG. 2 by an external force. As illustrated in FIGS. 1, 2, and 3, a conventional HDD includes a disk 110 coated with a magnetic material for recording and storing data, a spindle motor 140 on which the disk 110 is supported and which is capable of rotating, and a base 130 on which the disk 110 and the spindle motor 140 are assembled. The other elements will be described below.

The spindle motor 140 includes a fluid dynamic bearing (FDB) 150, a hub 160 partially coupled to the FDB 150 and supporting the disk 110, and a power generation portion 170 generating power to rotate the hub 160. The FDB 150 includes an FDB fixing portion 151 fixed to the base 130 by a flange 144 located thereunder and an FDB rotation portion 153 partially inserted in the FDB fixing portion 151 and relatively rotating with relative respect to the FDB fixing portion 151, to form a rotation center of and with the hub 160.

An insertion groove portion 151a in which the FDB rotation portion 153 is inserted is formed in the FDB fixing portion 151. The insertion groove portion 151a is filled with a predetermined fluid 152. The fluid 152 performs a role of not only supporting a weight of the hub 160, the disk 110, and the spacer 113 coupled to the FDB rotation portion 153 but also of allowing the FDB rotation portion 153 to freely rotate in the insertion groove portion 151a.

The FDB rotation portion 153 includes a rotation shaft portion 154 formed lengthwise in a vertical direction and coupled to the hub 160 in an upper area and a shaft support portion 155 formed in a lower portion of the rotation shaft portion 154 to be relatively larger compared to a cross sectional area of the rotation shaft portion 154. A plurality of fluid groove portions 156a and 156b are formed in an outer surface of the rotation shaft portion 154 and the shaft support portion 155, respectively. As the fluid 152 filling an inside of the insertion groove portion 151a freely flows in the fluid groove portions 156a and 156b, the FDB rotation portion 153 smoothly rotates.

In the meantime, the disk 110 and the hub 160 vibrate for various reasons, for example, when an impact stronger than a load of a hydraulic pressure provided by the fluid 152 is applied to the spindle motor 140. Accordingly, a position of the FDB rotation portion 153 is moved so that the FDB rotation portion 153 strongly collides against an inner wall of the FDB fixing portion 151 in the insertion groove portion 151a. In this case, the fluid groove portion 156a is blocked so that the fluid 152 cannot flow freely. Consequently, the FDB rotation portion 153 is stuck to the inner wall of the FDB fixing portion 151 (please refer to a portion P of FIG. 3). Thus, a sticking phenomenon may occur where the rotation of the FDB rotation portion 153 is restricted.

When the rotation of the FDB rotation portion 153 is restricted, the hub 160 coupled to the FDB rotation portion 153 does not rotate and thus the disk 110 coupled to the hub 160 does not rotate. However, in the conventional HDD, since no mechanical portion to prevent the sticking phenomenon is provided, smooth rotation of the disk 110 is not guaranteed so that the performance and reliability of the HDD are deteriorated.

SUMMARY OF THE INVENTION

The present general inventive concept provides a hard disk drive which can effectively prevent sticking so that smooth rotation of the disk is guaranteed, thus improving the performance and reliability of the hard disk drive.

Additional aspects and utilities of the present general inventive concept will be set forth in part in the description which follows and, in part, will be obvious from the description, or may be learned by practice of the general inventive concept.

The foregoing and/or other aspects of the present general inventive concept may be achieved by providing a hard disk drive including a base, a cover coupled to an upper portion of the base to accommodate a plurality of parts between the cover and the base, a spindle motor including a FDB (fluid dynamic bearing) having an FDB fixing portion fixed to the base and an FDB rotation portion partially inserted in an inside of the FDB fixing portion and to rotate with respect to the FDB fixing portion, a hub to support a disk, having an end portion coupled to the FDB rotation portion, and to rotate with the FDB rotation portion, and a power generation portion to generate power to rotate the hub, and an anti-stuck portion provided at least one of the cover and the spindle motor and which prevents the FDB rotation portion from being restricted as the FDB rotation portion partially contacts the FDB fixing portion by an impact applied to the spindle motor when the disk rotates.

The anti-stick portion may include a protruding end portion which protrudes from an upper surface of the FDB rotation portion to be higher than an upper surface of the FDB fixing portion toward the cover and a stopper provided in an upper portion area of the protruding end portion to restrict a width in which the protruding end portion moves.

An insertion groove portion in which the FDB rotation portion is inserted when filled with a predetermined fluid may be formed in the inside of the FDB fixing portion, the FDB rotation portion may contact the FDB fixing portion in the insertion groove portion to restrict the rotation of the FDB rotation portion when an impact relatively stronger than a load of a hydraulic pressure provided by the fluid is applied to the spindle motor, and the protruding end portion may contact the stopper in advance before the FDB rotation portion contacts the FDB fixing portion so that the FDB rotation portion is controlled to be in a regular position.

The stopper may include an upper wall portion coupled at a predetermined position and a side wall portion extending from an outer circumferential surface of the upper wall portion toward the protruding end portion and forming with the upper wall portion an end portion insertion groove in which the protruding end portion is partially inserted.

The stopper may substantially have a reverse U shape.

A cross-sectional area of the end portion insertion groove may be relatively larger than that of the protruding end portion.

An interval between an inner wall surface of the side wall portion and an outer wall surface of the protruding end portion may be relatively smaller than a width in which the FDB rotation portion moves at its maximum.

A height from the base to a lower end of the side wall portion may be relatively lower than a height from the base to an upper surface of the protruding end portion.

The hard disk drive may further include a clamp screw coupled to the hub through a predetermined clamp to fix the disk to the hub, wherein a predetermined separation interval is formed between an outer wall surface of the side wall portion and the clamp screw so as not to restrict the coupling of the clamp screw.

The stopper may have elasticity.

The stopper may be manufactured of any one selected from a group consisting of rubber, silicon, ceramic, synthetic resin, and thin film stainless steel.

An upper wall portion of the stopper may be coupled to the cover.

A double-sided tape may be interposed between the cover and the upper wall portion to attach the upper wall portion to the cover.

The upper wall portion may be attached to the cover using an adhesive.

A groove in which the stopper is partially inserted may be further formed in a surface of the cover.

The stopper may be forcibly inserted in the groove or partially attached to the groove.

The upper wall portion of the stopper may be coupled to the cover using a bolt.

A nut may be insert-injected inside the upper wall portion to couple with the bolt.

A flange may be further provided in a lower portion of the FDB fixing portion to be coupled to the FDB fixing portion and the flange has a lower portion area that penetrates the base to be exposed by a predetermined length outside the base.

The foregoing and/or other aspects of the present general inventive concept may also be achieved by providing a disk drive including a base, a spindle motor attached to the base, the spindle motor including a fluid dynamic bearing (FDB) having an FDB fixing portion fixed to the base and an FDB rotation portion partially inserted in a fluid inside of the FDB fixing portion to rotate with respect to the FDB fixing portion, a hub, and a disk supported by the hub of the spindle motor, and a cover to cover the base, the spindle motor, and the disk and to restrict horizontal movement of the FDB rotation portion, wherein the FDB rotation portion includes a protruding end portion coupled to the cover.

The foregoing and/or other aspects of the present general inventive concept may also be achieved by providing a disk drive including a base, a spindle motor attached to the base, the spindle motor including a fluid dynamic bearing (FDB) having an FDB fixing portion fixed to the base and an FDB rotation portion to rotate with respect to the FDB fixing portion, and a hub, and a disk supported by the hub of the spindle motor, and a cover to cover the base, the spindle motor, and the disk and to restrict lateral movement of the FDB rotation portion due to impact upon the spindle motor, wherein the FDB rotation portion includes a protruding end portion extending beyond the top of the hub and the cover includes a stopper portion having a cross sectional area greater than that of the protruding end portion to control movement of the protruding end portion due to impact upon the spindle motor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
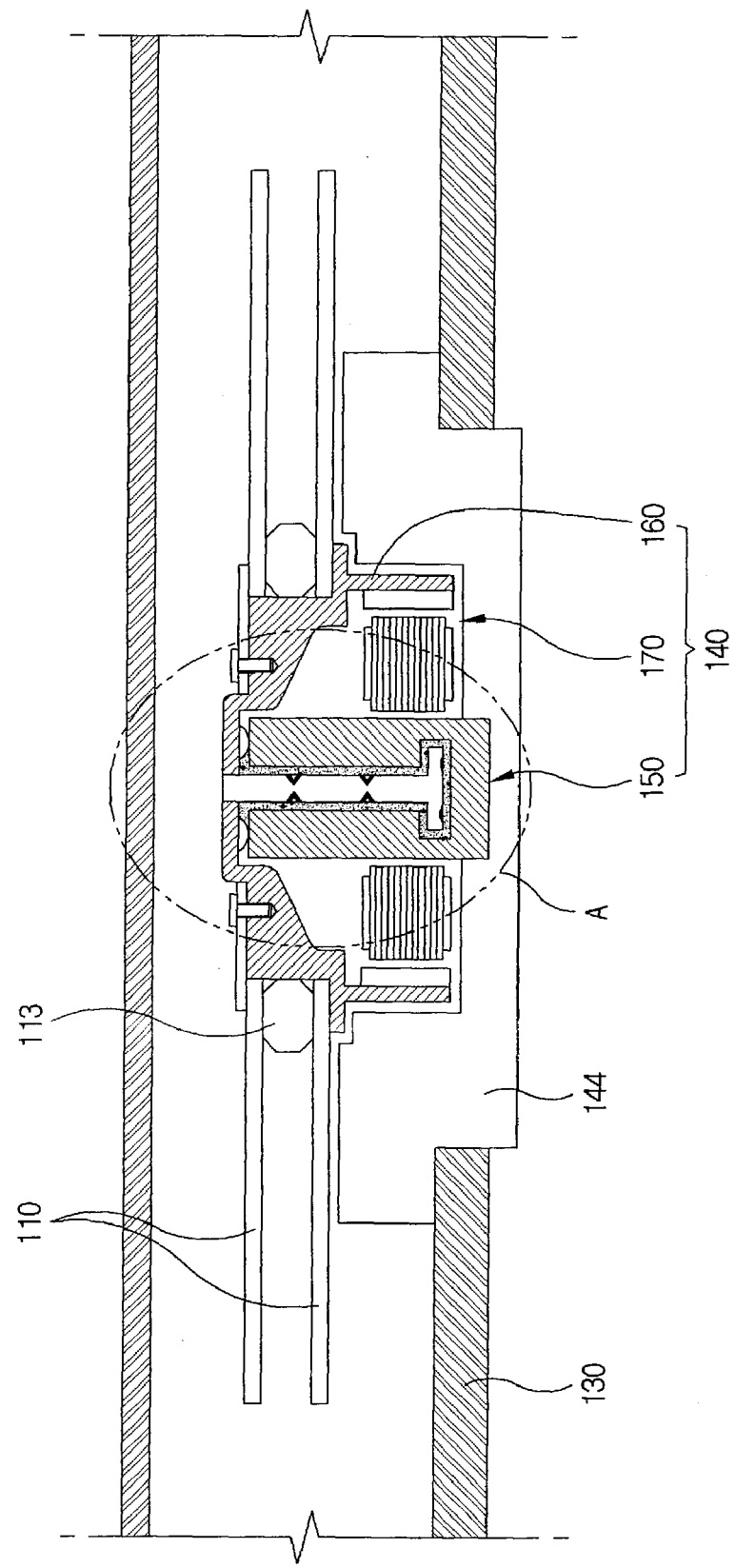
FIG. 1 illustrates a partial cross sectional view of a conventional hard disk drive.
Figure 2:
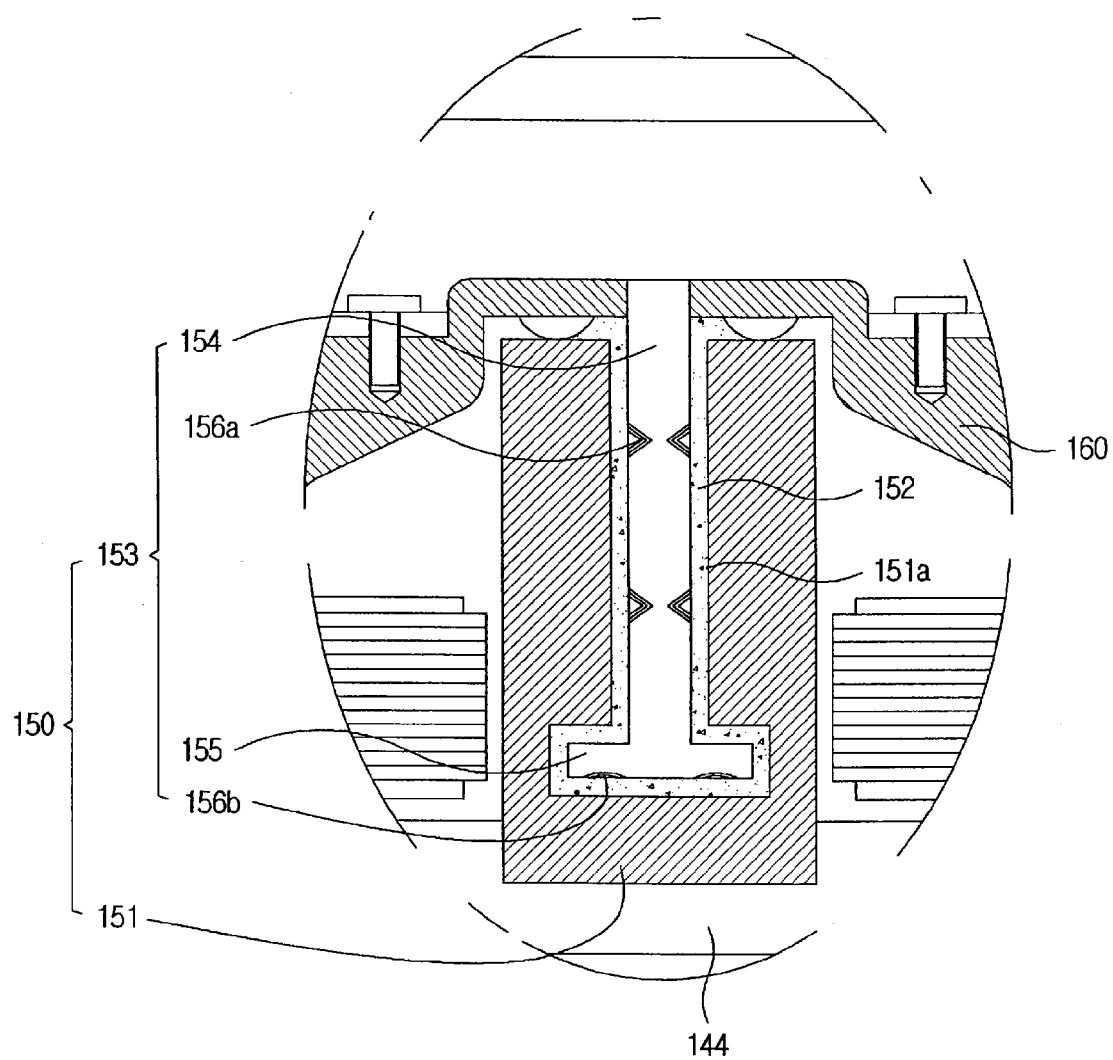
FIG. 2 illustrates an enlarged view of a portion A of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
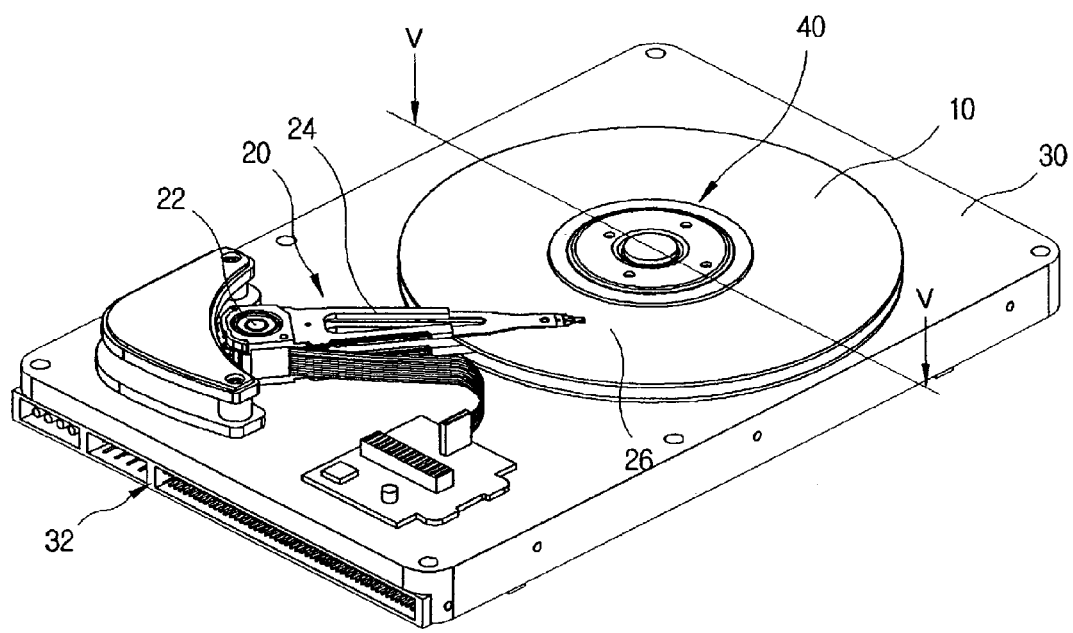
FIG. 4 illustrates a partial perspective view of a hard disk drive according to an embodiment of the present general inventive concept.
Figure 5:
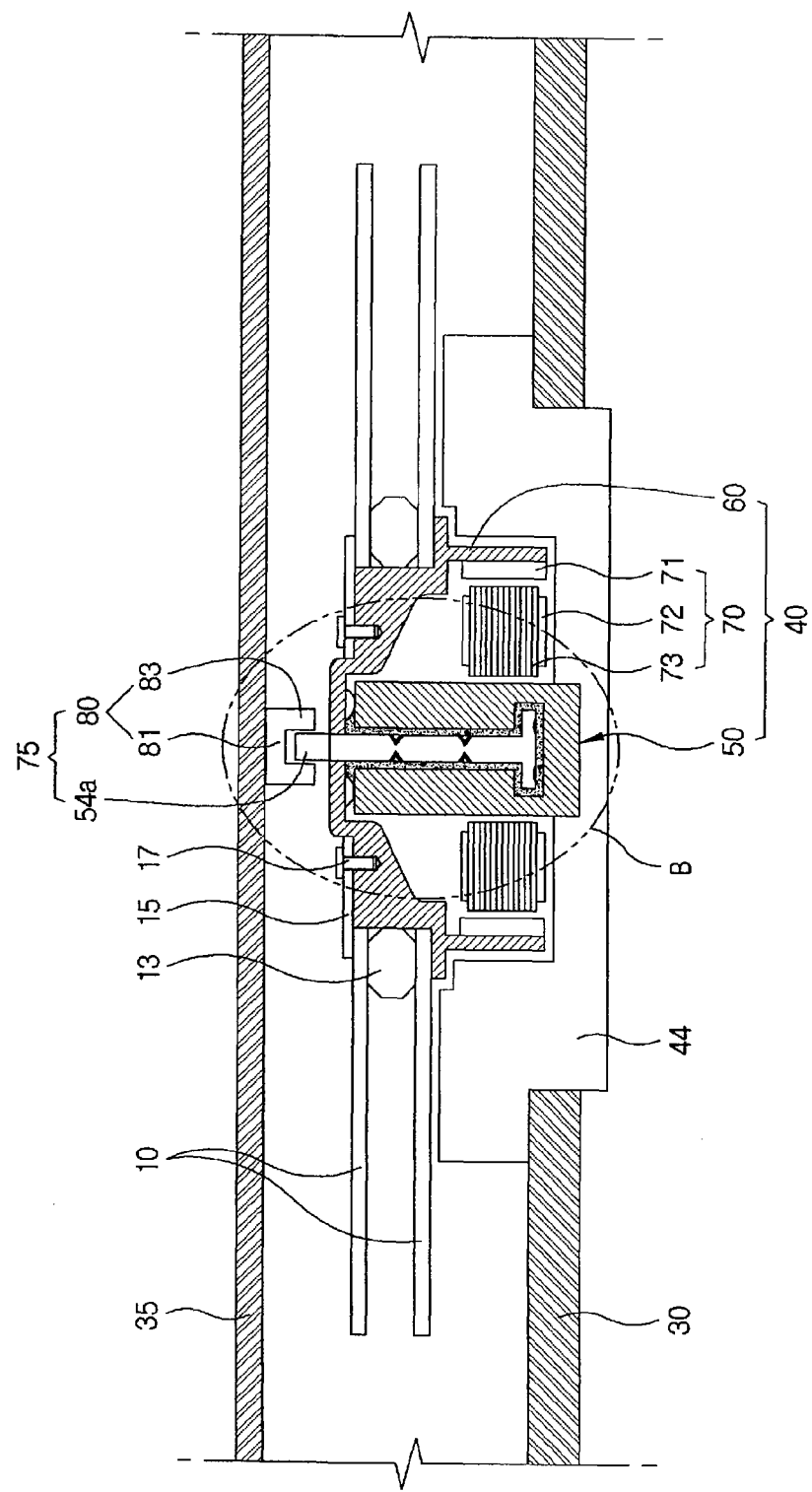
FIG. 5 illustrates a cross sectional view taken along line V-V of FIG. 4.
Figure 6:
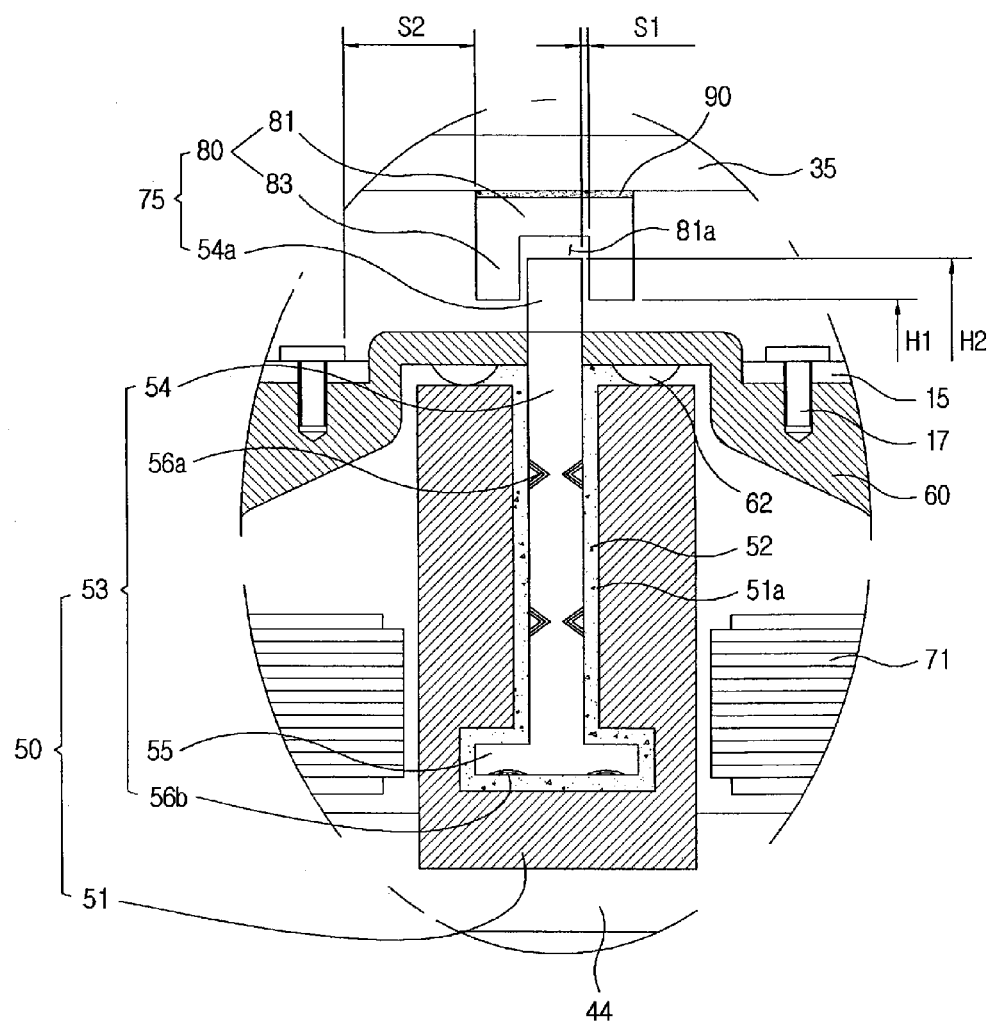
FIG. 6 illustrates an enlarged view of a portion B of FIG. 5.
Figure 7:
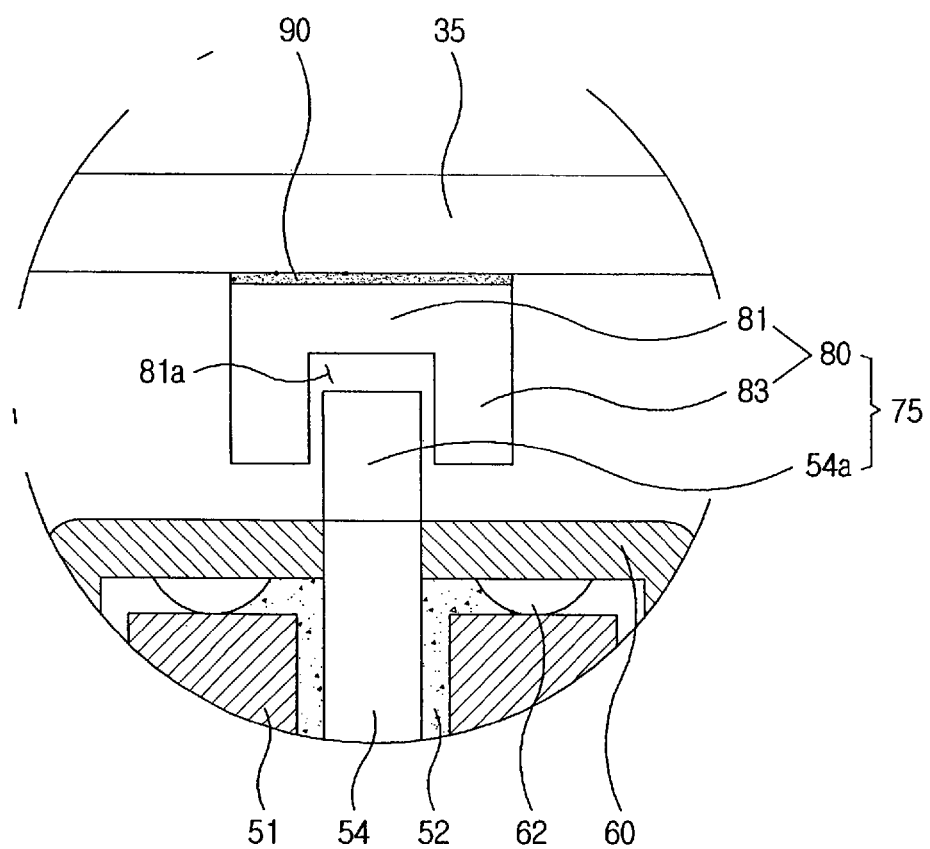
FIG. 7 illustrates an enlarged view of an anti-stick portion of FIG. 6.

FIG. 4 illustrates a partial perspective view of a hard disk drive according to an embodiment of the present general inventive concept. FIG. 5 illustrates a cross sectional view taken along line V-V of FIG. 4. FIG. 6 illustrates an enlarged view of a portion B of FIG. 5. FIG. 7 illustrates an enlarged view of an anti-stick portion 75 of FIG. 6.

Referring to FIGS. 4, 5, 6, and 7, and mainly FIGS. 4 and 5, a hard disk drive (HDD) according to an embodiment of the present general inventive concept includes a disk 10 to record and store data, a head stack assembly (HSA) 20, a spindle motor 40 to support the disk 10 and which is capable of rotating, a fluid dynamic bearing (FDB) 50 which is used for rotation, a printed circuit board assembly (PCBA) 32 having a printed circuit board (PCB) on which most circuit parts are installed and which controls various parts, a base 30 on which the above constituent elements are assembled, and a cover 35 to cover the base 30.

For the disk 10, a single disk may be used for the HDD, but a plurality of disks may be used to record or store a larger amount of data. In the case of using plural disks, a spacer 13 having a ring shape separating the disks 10 from each other is provided between the disks. In such a case, a spacer 13 is provided between two disks 10 to separate the two disks 10 from each other. The spacer 13 arranged between the disks 10 is coupled to a side portion of the hub 60 so that the disks 10 are supported on the hub 60 by being separated from each other. For example, a diameter of the disk 10 may be 3.5 inches.

A clamp 15 which integrally supports the disk 10 with the hub 60 is provided above the disk 10 to allow the disk 10 to be firmly fixed to the hub 60. The clamp 15 is fixed using a clamp screw 17 and supports the disk 10. For reference, although in the drawings the clamp 15 is simply illustrated for convenience of explanation, it is not actually manufactured to have a simple disk shape.

When the clamp screw 17 is coupled to the hub 60 through the clamp 15, the disk 10 is firmly fixed to the hub 60. When a clamping torque formed in the clamp screw 17 is too low, a possibility of generation of disk slip increases. Nevertheless, when the clamping torque is too high, warpage may be generated in the disk 10 or a repeatable run out (RRO) may increase so that performance of the spindle motor 40 is deteriorated, which may have an ill effect on a track miss registration (TMR) margin. Thus, the clamping torque of the clamp screw 17 needs to be designed within an appropriate range.

The HSA 20 includes an actuator 24 that moves across the disk 10 around a pivot shaft 22 and a magnetic head 26, or a read/write head, provided at an end portion of the actuator 24. When a recording or reproduction process starts and the disk 10 is rotated by the spindle motor 40, the actuator 24 moves the magnetic head 26 to a predetermined position on the disk 10 to proceed with the recording or reproduction process. The spindle motor 40 which supports and rotates the disk 10 includes a fluid dynamic bearing (FDB) 50, the hub 60 which is partially coupled to the FDB 50, and a power generation portion 70 to generate power to rotate the hub 60.

The hub 60 and the power generation portion 70 will now be described. The hub 60 constitutes an outer portion of the spindle motor 40 and is used as a portion to support the disk 10 as described above. The hub 60 is formed of aluminum (Al) and an outer surface thereof has a stepped shape for assembly. An end portion of the hub 60 is coupled to an FDB rotation portion 53 which will be described later. Thus, the hub 60 rotates together with the FDB rotation portion 53.

The power generation portion 70 which rotates the hub 60 includes a magnet 71 fixed to an inner side surface of the hub 60 and a stator 72 located close to the magnet 71 and having a coil 73 wound therearound. When power is applied to the coil 73, an electric field is generated. As a magnetic field of the magnet 71 is affected by the electric field, the hub 60 is rotated by a rotational force generated by an interaction between the electric field and the magnetic field. Accordingly, the disk 10 supported by the hub 60 rotates together with the hub 60 and FDB rotation portion 53. When the hub 60 rotates, a center of rotation of the hub 60 is the FDB rotation portion 53.

Referring to FIGS. 5 and 6, the FDB 50 includes an FDB fixing portion 51 and the FDB rotation portion 53, which is partially inserted in the FDB fixing portion 51 to rotate with respect to the FDB fixing portion 51 and to form the rotation center of the hub 60. A flange 44 is provided under the FDB fixing portion 51 and coupled to the FDB fixing portion 51. The flange 44 is exposed out of the base 30 to a predetermined length as a lower portion of the flange 44 penetrates the base 30. This structure enables the FDB fixing portion 51 to be fixed to the base 30.

An insertion groove portion 51a in which the FDB rotation portion 53 is inserted is formed in the FDB fixing portion 51. The insertion groove portion 51a has a shape almost similar to that of the FDB rotation portion 53, but a volume of the insertion groove portion 51a is larger than that of the FDB rotation portion 53.

A predetermined fluid 52 fills the insertion groove portion 51a. The fluid 52 supports a load of the hub 60, the disk 10, the spacer 13, and the magnet 71 which are coupled to the FDB rotation portion 53 and also allows the FDB rotation portion 53 to freely rotate in the insertion groove portion 51a. When the fluid 52 is lost, the rotation of the FDB rotation portion 53 is not guaranteed and the disk 10 is not able to rotate smoothly. Thus, a protrusion portion 62 is formed on an upper inner side of the hub 60 and contacts an upper surface of the FDB fixing portion 51 so as to prevent loss of the fluid 52 that fills the insertion groove portion 51a. As a result, the protrusion portion 62 prevents the fluid 52 from escaping out of the FDB fixing portion 51.

The FDB rotation portion 53 is formed lengthwise in a vertical direction and includes a rotation shaft portion 54 having an upper end protruding above an upper surface of the FDB fixing portion 51 to form a protruding end portion 54a and a shaft support portion 55 formed at a lower end of the rotation shaft portion 54 to have a cross-sectional area larger than that of the rotation shaft portion 54.

In the present general inventive concept, unlike the conventional technology, the protruding end portion 54a is further formed at the upper end of the rotation shaft portion 54 which engages with a stopper 80 that will be described later. The protruding end portion 54a is separately manufactured to be coupled to the upper end of the rotation shaft portion 54 or formed by manufacturing the rotation shaft portion 54 itself to be longer. In the drawings, in order to clearly show a position of the protruding end portion 54a, a boundary area between the protruding end portion 54a and the rotation shaft portion 54 is indicated by a solid line (FIGS. 5 through 9).

A plurality of fluid groove portions 56a and 56b are formed in an outer surface of the rotation shaft portion 54 and the shaft support portion 55. In particular, the fluid groove portion 56a formed in the outer surface of the rotation shaft portion 54 may be continuously arranged spirally along an outer circumferential surface of the rotation shaft portion 54. When the fluid 52 fills an inside of the insertion groove portion 51a flows freely, the fluid groove portions 56a and 56b guarantee smooth rotation of the FDB rotation portion 53.

Figure 3:
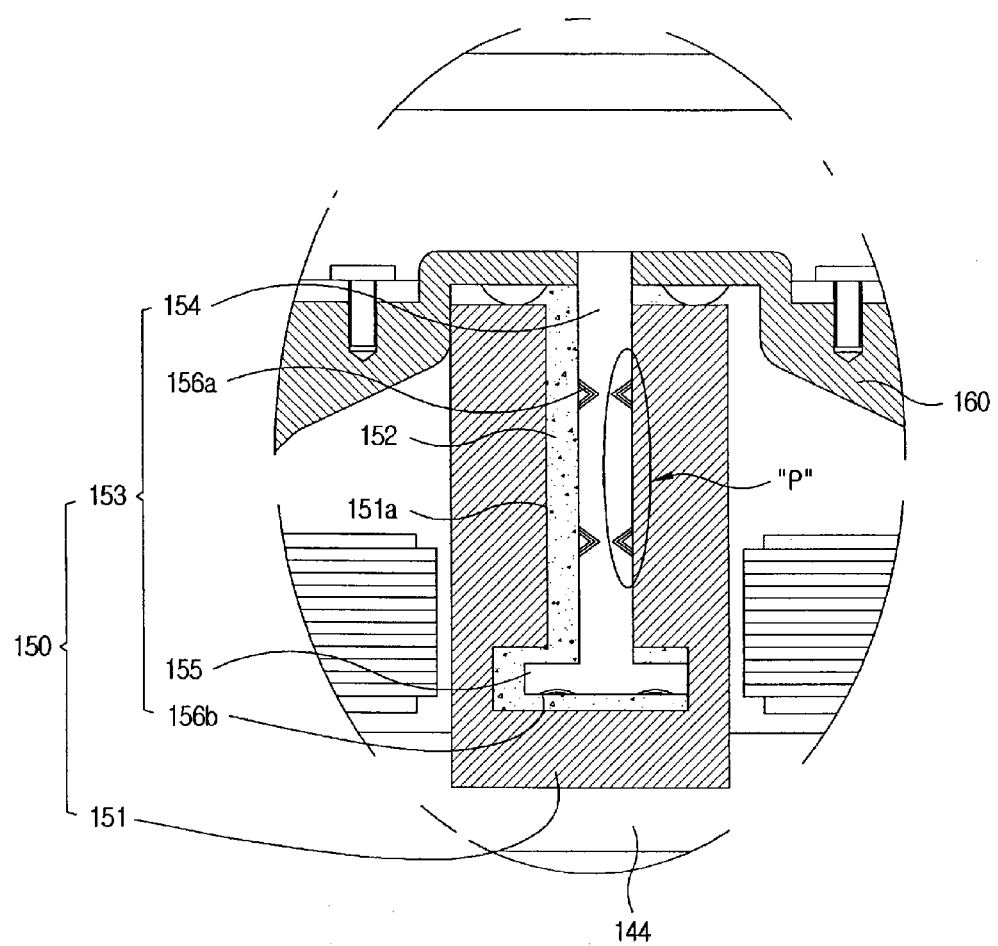
FIG. 3 illustrates a state in which an FDB rotation portion is stuck to an FDB fixing portion of FIG. 2 due to an external impact.

As described above, the disk 10 and the hub 60 vibrate for various reasons, for example, when an impact or vibration stronger than a load of a hydraulic pressure provided by the fluid 52 is applied to the spindle motor 40. Accordingly, a position of the FDB rotation portion 53 moves so that the FDB rotation portion 53 contacts an inner wall of the FDB fixing portion 51 in the insertion groove portion 51a. In this case, since the fluid 52 cannot flow freely between the FDB rotation portion 53 and the FDB fixing portion 51 when contacting each other, the FDB rotation portion 53 sticks to the inner wall of the FDB fixing portion 51 (please refer to the portion P of FIG. 3). Thus, a sticking phenomenon that restricts the rotation of the FDB rotation portion 53 may be caused.

When the rotation of the FDB rotation portion 53 is restricted, the hub 60 coupled to the FDB rotation portion 53 cannot rotate so that the disk 10 coupled to the hub 60 does not rotate. Therefore, to prevent generation of the sticking phenomenon which may be caused by the application of an impact or vibration stronger than a load of a hydraulic pressure provided by the fluid 52 to the spindle motor 40, there is a need to prevent the FDB rotation portion 53 from contacting the inner wall of the FDB fixing portion 51 in the insertion groove portion 51a and being stuck thereto. Such a need can be met using an anti-stick portion 75.

The anti-stick portion 75 includes the protruding end portion 54a protruding from the upper surface of the rotation shaft portion 54 along the lengthwise direction of the rotation shaft portion 54 toward the cover 35 higher than the upper surface of the FDB fixing portion 51, and a stopper 80 provided in an upper portion of the protruding end portion 54a and to restrict a width in which the protruding end portion 54a moves.

A width in which the protruding end portion 54a moves in a horizontal direction, as described above, refers to a width in which the protruding end portion 54a moves out of a regular position for various reasons, for example, when a relatively strong impact is applied to the spindle motor 40. Consequently, before the FDB rotation portion 53 contacts the FDB fixing portion 51 due to an impact, the protruding end portion 54a controls the FDB rotation portion 53 at a regular position by contacting the stopper 80 in advance. That is, the protruding end portion 54a, colliding against the stopper 80 due to the impact, absorbs the impact or bounds back in an opposite direction so that the FDB rotation portion 53 is controlled to be at the regular position.

Thus, in view of the FDB rotation portion 53, since a position of the FDB rotation portion 53 is controlled by the anti-stick portion 75 before the FDB rotation portion 53 contacts the FDB fixing portion 51, even when a strong impact is applied to the spindle motor 40, the FDB rotation portion 53 does not strongly contact the FDB fixing portion 51. Thus, the generation of the sticking phenomenon can be effectively prevented.

The stopper 80 interacting with the protruding end portion 54a includes an upper wall portion 81 coupled to the cover 35 and a side wall portion 83 extending from an outer circumferential surface of the upper wall portion 81 toward the rotation shaft portion 54 and forming an end portion insertion groove 81a with the upper wall portion 81 in which the protruding end portion 54a of the rotation shaft portion 54 is partially inserted. It can be seen from the above structure that the stopper 80 substantially has an inverted U shape.

The cross-sectional area of the end portion insertion groove 81a is relatively larger than that of the protruding end portion 54a of the FDB rotation portion 53. Thus, movement of the FDB rotation portion 53, in detail, movement of the protruding end portion 54a, within a predetermined width in the horizontal direction, can be compensated to a degree. However, the cross-sectional area of the end portion insertion groove 81a does not need to be significantly larger than that of the protruding end portion 54a.

Accordingly, an interval S1 between the inner wall surface of the side wall portion 83 and the outer wall surface of the protruding end portion 54a needs to be relatively smaller than a width in which the FDB rotation portion 53 is moved at its maximum by an impact applied to the spindle motor 40. This is because the protruding end portion 54a can contact the inner wall of the side wall portion 83 of the stopper 80 before the FDB rotation portion 53 contacts the FDB fixing portion 51 in the insertion groove portion 51a, so that the FDB rotation portion 53 is prevented from sticking to the FDB fixing portion 51.

Considering a length of the side wall portion 83 of the stopper 80, a height H1 from the base 30 to a lower end of the side wall portion 83 is relatively lower than a height H2 from the base 30 to an upper surface of the protruding end portion 54a. Accordingly, even when any level of impact is applied, the protruding end portion 54a can contact the side wall portion 83 of the stopper 80 and will not escape from the end portion insertion groove 81a.

Also, considering a volume or a horizontal length of the stopper 80, as described above, when coupling the clamp screw 17, the clamping torque formed in the clamp screw 17 is important. Thus, the volume or horizontal length of the stopper 80 needs to be formed within a range so as not to restrict the coupling of the clamp screw 17. Thus, as in the present general inventive concept, it is preferable that a predetermined separation interval S2 is formed between an outer wall surface of the side wall portion 83 of the stopper 80 and the clamp screw 17.

As described above, the anti-stick portion 75 prevents the FDB rotation portion 53 from contacting the FDB fixing portion 51 in the insertion groove portion 51a. Thus, if the stopper 80 in which the protruding end portion 54a contacts has a predetermined elasticity, when the protruding end portion 54a contacts the inner wall of the side wall portion 83 of the stopper 80, it is advantageous that the FDB rotation portion 53 be controlled at the original position by an elastic repulsion of the stopper 80.

In the present general inventive concept, the stopper 80 may be manufactured of a material having a predetermined elasticity. The material having a predetermined elasticity may include rubber, silicon, ceramic, and synthetic resin that substantially does not have outgas. However, a thin film stainless steel which can structurally be formed to provide elasticity can be used.

The stopper 80 interacts with the protruding end portion 54a formed in the upper portion of the FDB rotation portion 53 so that the stopper 80 is coupled to the cover 35 located above the FDB rotation portion 53. In the present general inventive concept, double-sided tape 90 may be interposed between the cover 35 and the upper wall portion 81 to couple the stopper 80 to the cover 35. However, an adhesive (not illustrated) may be used instead of the double-sided tape 90.

Referring to FIG. 4, in the operation of the HDD configured as described above, when power is applied to the HDD and recording and reproduction starts, the disk 10 is rotated by the spindle motor 40 and the actuator 24 moves the magnetic head 26 to a predetermined position on the disk that is rotating so that recording and reproduction is performed.

When an impact is applied to the HDD during the recording and reproduction, in particular, an impact relatively stronger than the load of a hydraulic pressure provided by the fluid 52 is applied to the spindle motor 40, the FDB rotation portion 53 that is interactively coupled to the hub 60 and the disk 10 is moved to one side. At this moment, before the FDB rotation portion 53 contacts the FDB fixing portion 51 in the insertion groove portion 51a, the protruding end portion 54a of the FDB rotation portion 53 contacts the inner wall of the side wall portion 83 of the stopper so as to reduce the impact or is controlled to the original position by an elastic repulsive force of the side wall portion 83.

Thus, generation of the sticking phenomenon generated as the FDB rotation portion 52 strongly contacts the FDB fixing portion 51 in the insertion groove portion 51*a* (please refer to the portion P of FIG. 3) can be fundamentally restricted so that the smooth rotation of the disk 10 can be guaranteed. According to the present general inventive concept, by effectively preventing the generation of the sticking phenomenon, the smooth rotation of the disk 10 can be guaranteed. Accordingly, performance and reliability of the HDD can be improved.

Figure 8:
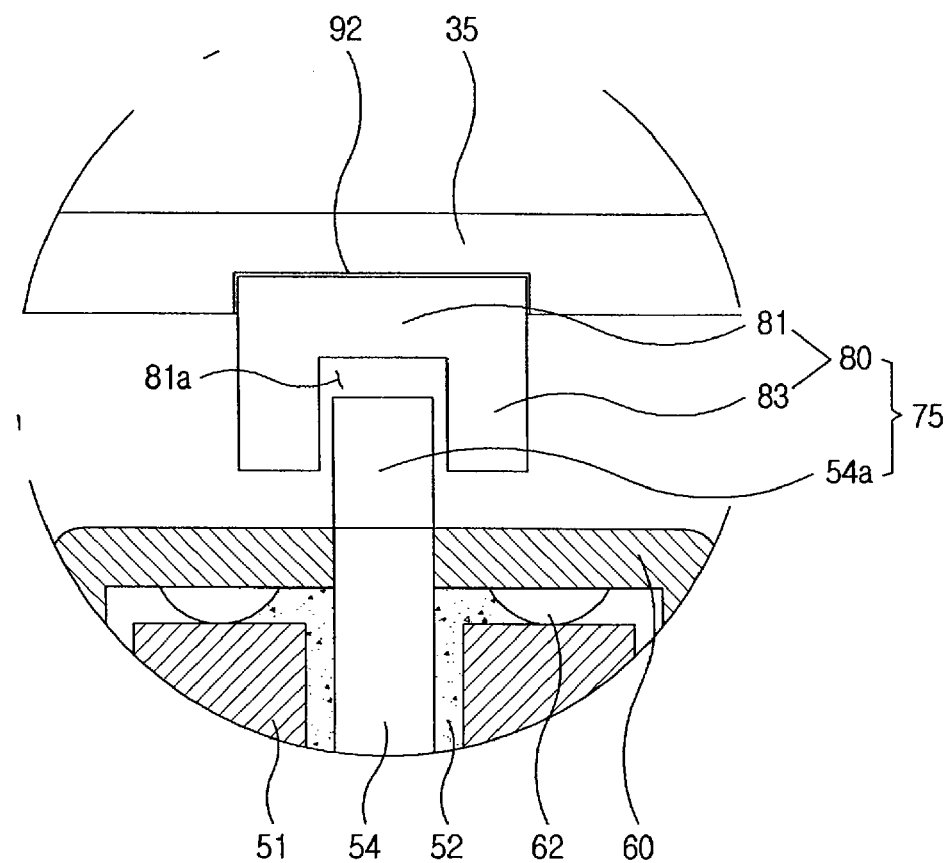
FIG. 8 illustrates an enlarged view of an anti-stick portion according to another embodiment of the present general inventive concept.

FIG. 8 illustrates an enlarged view of an anti-stick portion according to another embodiment of the present general inventive concept. In the above-described embodiment, a stopper 80 is attached to a cover 35 using double-sided tape 90 (refer to FIG. 7). In this embodiment of the general inventive concept, however, a groove 92 in which the stopper 80 is partially inserted is further formed in an inner surface of the cover 35 and the stopper 80 is forcibly inserted in the groove 92 or partially attached thereto. The embodiment of FIG. 8 is an example which enables prevention of the stopper 80 from escaping or being separated from a regular position of the stopper 80.

Figure 9:
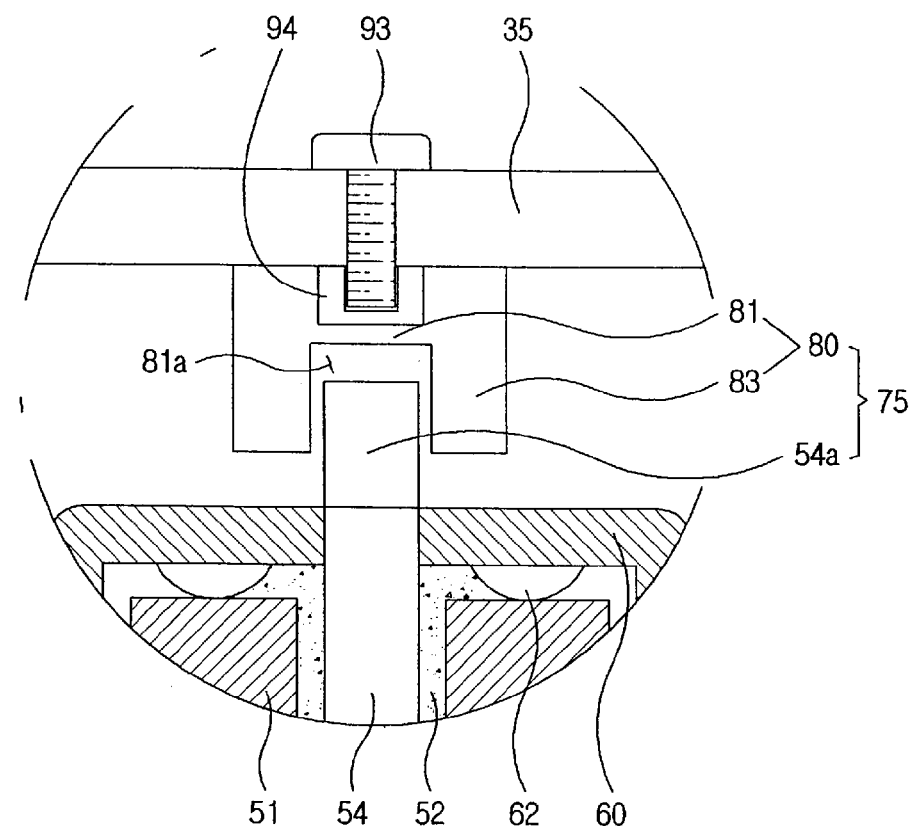
FIG. 9 illustrates an enlarged view of an anti-stick portion according to yet another embodiment of the present general inventive concept.

FIG. 9 illustrates an enlarged view of an anti-stick portion according to yet another embodiment of the present general inventive concept. In this embodiment, the stopper 80 is coupled to the cover 35 using a bolt 93. In this case, the bolt 93 penetrates the cover 35 from an outer surface thereof and is coupled to the stopper 80. For firmer coupling, a nut 94 is insert-injected in an inside of the stopper 80 so that the bolt 93 is coupled to the nut 94.

In the above-described embodiments, although a 3.5" hard disk drive is mainly described, the technical concept of the present general inventive concept can be applied to a variety of hard disk drives having different sizes and capacities regardless of a size of a disk only if an installation space of an anti-stick portion is secured by using an FDB. Also, in the above-descried embodiments, although a base is illustrated as a flat type having an upper surface where a plurality of parts are located, the base may be a bowl type having a recessed inside so that a plurality of parts can be accommodated and assembled therein.

According to the above-described embodiments of the present general inventive concept, since the generation of the sticking phenomenon is effectively prevented, smooth rotation of the disk 10 can be guaranteed. Accordingly, performance and reliability of the HDD can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hard disk drive comprising:
a base;
a cover coupled to an upper portion of the base;
a spindle motor including a fluid dynamic bearing having a fixing portion fixed to the base and a rotation portion partially inserted in an inside of the fixing portion, the rotation portion to rotate about a first axis with respect to the fixing portion, a hub to support a disk and having an end portion coupled to the rotation portion to rotate with the rotation portion, and a power generation portion to generate power to rotate the hub; and
an anti-stick portion to prevent a restriction of rotation of the rotation portion, the anti-stick portion including a stopper located on the cover and a protruding end portion protruding from an upper end of the rotation portion, the stopper including side walls surrounding the protruding end portion along a first plane perpendicular to the first axis,
wherein the protruding end portion contacts the side walls before the rotation portion contacts the fixing portion when the rotation portion moves in a direction along the first plane.

2. The hard disk drive of claim 1, wherein the fixing portion includes an insertion groove portion into which the rotation portion is inserted,
the rotation portion contacts the insertion groove portion to restrict the rotation of the rotation portion when an impact relatively stronger than a load of a hydraulic pressure provided by a predetermined fluid in the insertion groove is applied to the spindle motor, and
the protruding end portion contacts the stopper before the rotation portion contacts the fixing portion so that the rotation portion is controlled to be in a regular position.

3. The hard disk drive of claim 2, wherein the stopper comprises:
an upper wall portion coupled at a predetermined position; and
the side walls extending from an outer circumferential surface of the upper wall portion toward the protruding end portion and forming with the upper wall portion an end portion insertion groove in which the protruding end portion is partially inserted.

4. The hard disk drive of claim 3, wherein the stopper substantially has an inverted U shape.

5. The hard disk drive of claim 4, wherein a cross-sectional area of the end portion insertion groove is relatively larger than that of the protruding end portion.

6. The hard disk drive of claim 5, wherein an interval between an inner wall surface of the side wall portion and an outer wall surface of the protruding end portion is relatively smaller than a width that the rotation portion moves at its maximum.

7. The hard disk drive of claim 3, wherein a height from the base to a lower end of the side wall portion is relatively lower than a height from the base to an upper surface of the protruding end portion.

8. The hard disk drive of claim 3, further comprising a clamp screw coupled to the hub through a predetermined clamp to fix the disk to the hub, wherein a predetermined separation interval is formed between an outer wall surface of the side wall portion and the clamp screw so as not to restrict coupling of the clamp screw.

9. The hard disk drive of claim 3, wherein an upper wall portion of the stopper is coupled to the cover.

10. The hard disk drive of claim 9, wherein a double-sided tape is interposed between the cover and the upper wall portion to attach the upper wall portion to the cover.

11. The hard disk drive of claim 9, wherein the upper wall portion is attached to the cover using an adhesive.

12. The hard disk drive of claim 9, wherein a groove in which the stopper is partially inserted is further formed in a surface of the cover.

13. The hard disk drive of claim 12, wherein the stopper is forcibly inserted in the groove or partially attached to the groove.

14. The hard disk drive of claim 9, wherein the upper wall portion of the stopper is coupled to the cover using a bolt.

15. The hard disk drive of claim 14, wherein, a nut is insert-injected inside the upper wall portion to couple with the bolt.

16. The hard disk drive of claim 2, wherein the stopper has elasticity.

17. The hard disk drive of claim 16, wherein the stopper is manufactured of any one selected from a group consisting of rubber, silicon, ceramic, synthetic resin, and thin film stainless steel.

18. The hard disk drive of claim 1, wherein a flange is further provided in a lower portion of the fixing portion to be coupled to the fixing portion and the flange has a lower portion area that penetrates the base to be exposed by a predetermined length outside the base.

19. A disk drive comprising:
a base;
a spindle motor attached to the base, the spindle motor comprising:
a fluid dynamic bearing having a fixing portion fixed to the base and a rotation portion partially inserted in a fluid inside of the fixing portion to rotate with respect to the fixing portion; and
a hub to support a disk; and
a cover to cover the base, the spindle motor, and the disk and to restrict a sideways movement of the fluid dynamic bearing rotation portion, the cover including a receiving portion in which an end of the fluid dynamic bearing rotation portion extends therein to limit sideways movement of the fluid dynamic bearing rotation portion,
wherein the receiving portion has an inverse U shape and is elastic.

20. The disk drive of claim 19, wherein the base includes a flange which has a lower portion area that penetrates the base to be exposed by a predetermined length outside the base.

21. The disk drive of claim 19, wherein the fluid dynamic bearing rotation portion contacts the fluid dynamic bearing fixing portion to restrict the rotation of the fluid dynamic bearing rotation portion when an impact relatively stronger than a load of a hydraulic pressure provided by the fluid is applied to the spindle motor.

22. The disk drive of claim 19, wherein the fluid dynamic bearing rotation portion is formed lengthwise to extend away from the base and includes a rotation shaft portion and an end portion that protrudes above an upper surface of the fluid dynamic bearing fixing portion to form a protruding end portion that protrudes into the receiving portion and a shaft support portion formed at a lower end of the rotation shaft portion to have a cross-sectional area larger than that of the rotation shaft portion.

23. The disk drive of claim 19, wherein a fluid groove portion formed in an outer surface of the rotation shaft portion is continuously arranged spirally along an outer circumferential surface of the rotation shaft portion.

24. The disk drive of claim 19, wherein the receiving portion comprises:
an upper wall portion and side wall portions attached to the cover to control the sideways movement of the protruding end portion of the rotation portion.

25. The disk drive of claim 19, wherein an interval between an inner wall surface of a side wall portion and an outer wall surface of the protruding end portion of the rotation portion is relatively smaller than a width in which the rotation portion moves at its maximum.

26. The disk drive of claim 25, wherein a height from the base to a lower end of the side wall portion is relatively lower than a height from the base to an upper surface of the protruding end portion of the rotation portion.

27. The disk drive of claim 19, wherein the receiving portion is manufactured of any one selected from a group consisting of rubber, silicon, ceramic, and synthetic resin.

28. A disk drive comprising:
a base;
a spindle motor attached to the base, the spindle motor comprising:
a fluid dynamic bearing having a fixing portion fixed to the base and a rotation portion to rotate with respect to the fixing portion; and
a hub to support a disk; and
a cover to cover the base, the spindle motor, and the disk and to restrict lateral movement of the rotation portion due to impact upon the spindle motor,
wherein the rotation portion includes a protruding end portion extending beyond the top of the hub and the cover includes a stopper portion having a cross sectional area greater than that of the protruding end portion to control movement of the protruding end portion due to impact upon the spindle motor, and
the stopper includes an elastic material.

29. A disk drive comprising:
a base;
a spindle motor mounted to the base, the spindle motor including a fixed portion that is fixed with respect to the base and a rotation portion that rotates with respect to the fixed portion;
a cover to cover the spindle motor,
wherein one of the cover and the spindle motor includes a protrusion centered on the axis of rotation of the rotation portion and the other of the cover and the spindle motor includes a stopper to receive the protrusion,
the stopper includes side walls to contact the protrusion portion to prevent lateral movement of the rotation portion, and
the stopper comprises an elastic material.

30. A disk drive comprising:
a base;
a spindle motor mounted to the base, the spindle motor including a fixed portion that is fixed with respect to the base and a rotation portion is inserted into the fixed portion to rotate with respect to the fixed portion;
a cover to cover the spindle motor,
wherein one of the cover and the spindle motor includes a protrusion centered on the axis of rotation of the rotation portion and the other of the cover and the spindle motor includes a stopper to receive the protrusion,
the stopper includes side walls to contact the protrusion portion to prevent lateral movement of the rotation portion, and
a distance between an outer surface of the protrusion and an inner surface of the side walls is less than a distance between an outer surface of the rotation portion inside the fixed portion and an opposing inner wall of the fixed portion when the rotation portion is substantially centered with respect to the fixed portion.

* * * * *